US012701580B2

(12) United States Patent
Liu et al.

(10) Patent No.: US 12,701,580 B2
(45) Date of Patent: Aug. 4, 2026

(54) TRANSPORT BLOCK SIZE AND SOFT BUFFER MANAGEMENT FOR SHARED CHANNEL TRANSMISSIONS

(71) Applicant: QUALCOMM Incorporated, San Diego, CA (US)

(72) Inventors: Chih-Hao Liu, San Diego, CA (US); Jing Sun, San Diego, CA (US); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 296 days.

(21) Appl. No.: 18/635,989

(22) Filed: Apr. 15, 2024

(65) Prior Publication Data

US 2025/0324428 A1      Oct. 16, 2025

(51) Int. Cl.
| | |
|---|---|
| *H04W 72/23* | (2023.01) |
| *H04L 1/00* | (2006.01) |
| *H04L 1/1812* | (2023.01) |
| *H04L 1/1829* | (2023.01) |
| *H04L 5/00* | (2006.01) |

(52) U.S. Cl.
CPC ........... H04W 72/23 (2023.01); H04L 1/0061 (2013.01); H04L 1/1812 (2013.01); H04L 1/1835 (2013.01); H04L 5/0055 (2013.01)

(58) Field of Classification Search
CPC .... H04W 72/23; H04L 1/0061; H04L 1/1812; H04L 1/1835; H04L 5/0055; H04L 1/1822
See application file for complete search history.

(56) References Cited

U.S. PATENT DOCUMENTS

| | | | | |
|---|---|---|---|---|
| 11,728,948 B2 * | 8/2023 | Lei | .......... | H04L 5/0044 |
| | | | | 370/329 |
| 12,213,128 B2 * | 1/2025 | Wang | .......... | H04L 1/1854 |
| 2011/0085508 A1 * | 4/2011 | Wengerter | .......... | H04L 5/0094 |
| | | | | 375/295 |

(Continued)

OTHER PUBLICATIONS

International Search Report and Written Opinion—PCT/US2025/ 021372—ISA/EPO—Jul. 8, 2025 (2400667WO).

(Continued)

*Primary Examiner* — J. Brant Murphy
(74) *Attorney, Agent, or Firm* — Holland & Hart LLP

(57) ABSTRACT

Methods, systems, and devices for wireless communications are described. A user equipment (UE) may communicate a shared channel transmission (e.g., a physical uplink shared channel (PUSCH) or a physical downlink shared channel (PDSCH)) that exceeds a maximum transport block (TB) size (TBS) for the UE. A shared channel transmission may be scheduled across slot boundaries. For example, a start and length indicator value may schedule a shared channel transmission across slots. A UE may have a maximum TBS the UE is able to manage, for example, based on hybrid automatic repeat request (HARQ) buffer sizes. When the TBS indicated by the scheduling information for a shared channel transmission is greater than the maximum TBS for a UE, the shared channel transmission may be split into multiple small TBs, each having a TBS that satisfies the maximum TBS. Code block segmentation and cyclic redundancy check attachment may be per small TB.

20 Claims, 13 Drawing Sheets

(56) References Cited

U.S. PATENT DOCUMENTS

| | | | |
|---|---|---|---|
| 2016/0014637 A1* | 1/2016 | Kim | H04L 1/0071 |
| | | | 370/328 |
| 2018/0205497 A1* | 7/2018 | Wang | H03M 13/05 |
| 2019/0158221 A1* | 5/2019 | Sarkis | H03M 13/116 |
| 2020/0053769 A1* | 2/2020 | Vos | H04L 1/0005 |
| 2020/0107347 A1* | 4/2020 | Basu Mallick | H04L 5/0055 |
| 2020/0344781 A1* | 10/2020 | Li | H04L 1/1664 |
| 2021/0092759 A1* | 3/2021 | Xiong | H04W 72/0446 |
| 2022/0210816 A1* | 6/2022 | Wu | H04B 7/0408 |
| 2023/0139174 A1* | 5/2023 | Paz | H04B 7/12 |
| | | | 370/329 |
| 2023/0188277 A1* | 6/2023 | Cheng | H04L 1/0061 |
| | | | 370/329 |
| 2023/0189288 A1* | 6/2023 | Karaki | H04W 72/12 |
| | | | 370/329 |
| 2024/0098714 A1* | 3/2024 | Lee | H04W 72/0446 |
| 2024/0137952 A1* | 4/2024 | Li | H04W 72/232 |

OTHER PUBLICATIONS

Samsung: "Maintenance issues on HARQ aspects for NTN", 3GPPTSG RAN WG1 #108, R1-2202013, e-Meeting, Nov. 11-19, 2021, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Feb. 14, 2022, 3 pages, XP052109941, p. 3, Option 2.

Sierra Wireless, et al., "NTN IoT HARQ Considerations", 3GPP TSG-RAN WG4 Meeting #104-e, R1-2101323, e-Meeting, Jan. 25-Feb. 5, 2021, 3rd Generation Partnership Project, Mobile Competence Centre, 650, Route Des Lucioles, F-06921 Sophia-Antipolis Cedex, France, vol. RAN WG4, No. e-Meeting, Jan. 25. 2021-Feb. 5, 2021, Jan. 19, 2021, 6 pages, XP051971510, p. 2, Table 1, p. 5, section 3.2.

* cited by examiner

130

105

115

Network
Entity

Transceiver

1110

Antenna

1115

Communications
Manager

1120

Memory

Code

1130

1125

1140

Processor

1135

1105

1100

Figure 12:
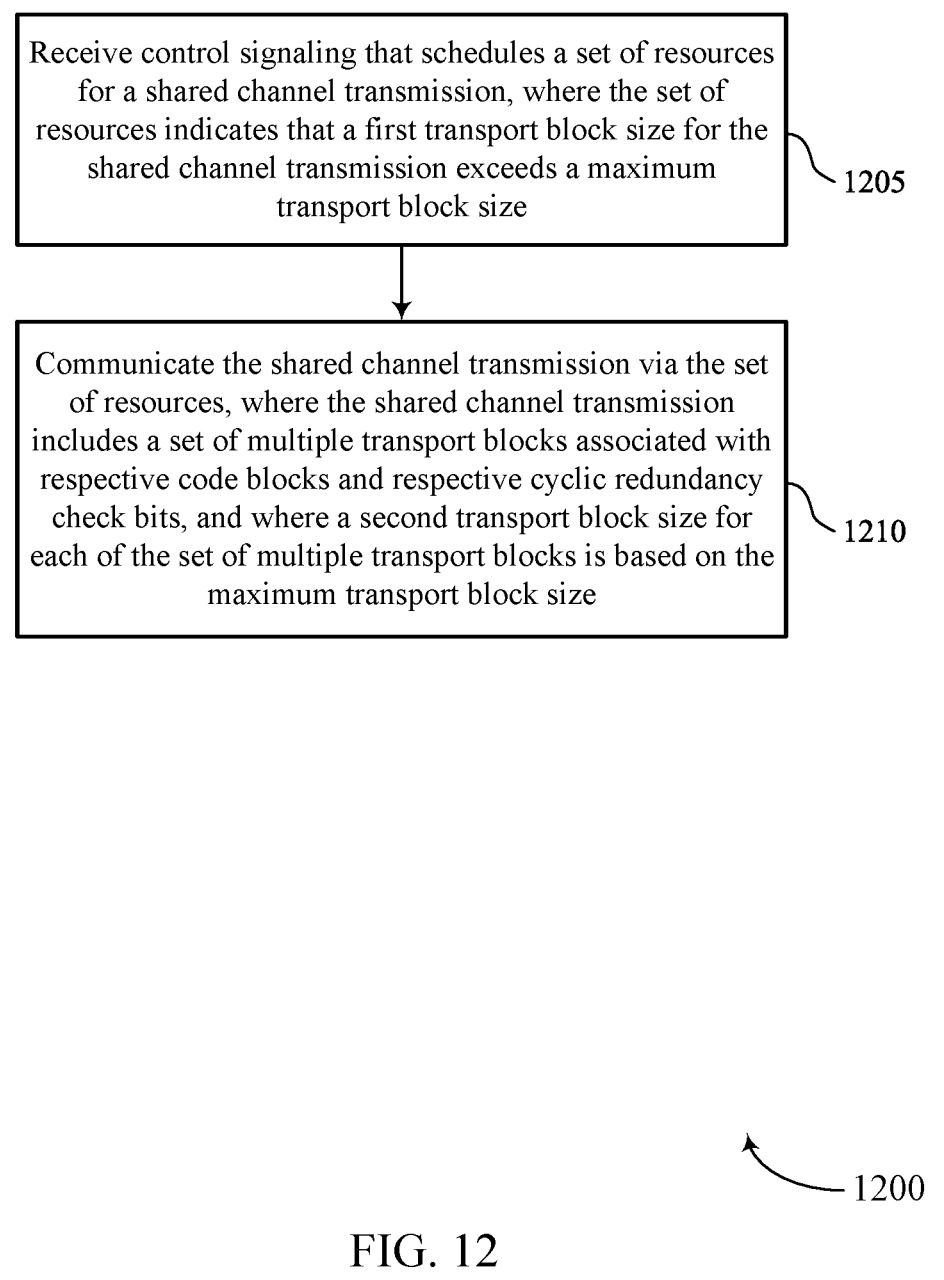

Receive control signaling that schedules a set of resources for a shared channel transmission, where the set of resources indicates that a first transport block size for the shared channel transmission exceeds a maximum transport block size

1205

Communicate the shared channel transmission via the set of resources, where the shared channel transmission includes a set of multiple transport blocks associated with respective code blocks and respective cyclic redundancy check bits, and where a second transport block size for each of the set of multiple transport blocks is based on the maximum transport block size

Figure 13:
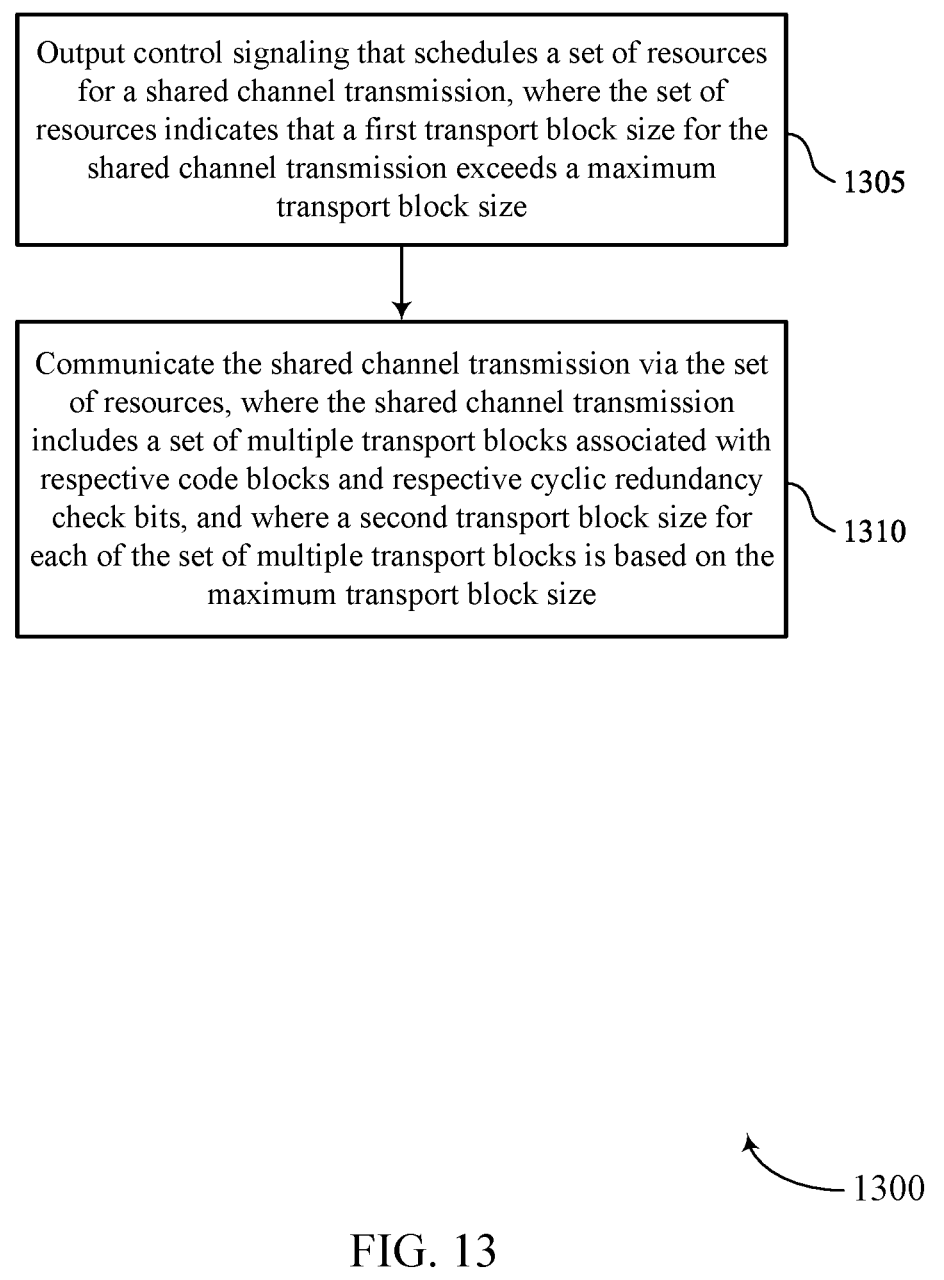

```
┌─────────────────────────────────────────────┐
│  Output control signaling that schedules a set of resources
│  for a shared channel transmission, where the set of
│  resources indicates that a first transport block size for the
│  shared channel transmission exceeds a maximum
│  transport block size
└─────────────────────────────────────────────┘ ⎰ 1305
                        │
                        ▼
┌─────────────────────────────────────────────┐
│  Communicate the shared channel transmission via the set
│  of resources, where the shared channel transmission
│  includes a set of multiple transport blocks associated with
│  respective code blocks and respective cyclic redundancy
│  check bits, and where a second transport block size for
│  each of the set of multiple transport blocks is based on the
│  maximum transport block size
└─────────────────────────────────────────────┘ ⎰ 1310
```

TRANSPORT BLOCK SIZE AND SOFT BUFFER MANAGEMENT FOR SHARED CHANNEL TRANSMISSIONS

FIELD OF TECHNOLOGY

The following relates to wireless communications, including transport block size and soft buffer management for shared channel transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support transport block (TB) size and soft buffer management for shared channel transmissions. For example, the described techniques provide for communication of shared channels transmissions by a user equipment (UE) that exceed a maximum TB size (TBS) for the UE. A shared channel transmission may be scheduled across slot boundaries. For example, a start and length indicator value (SLIV) in the scheduling information for the shared channel transmission may schedule a long shared channel transmission across slots. A UE may have a maximum TBS the UE is able to manage, for example, based on hybrid automatic repeat request (HARQ) buffer sizes. When the TBS indicated by the scheduling information for a shared channel transmission is greater than the maximum TBS for a UE, the shared channel transmission may be split into multiple smaller TBs, each TB having a TBS that satisfies the maximum TBS. Code block segmentation and cyclic redundancy check (CRC) attachment may be per small TB.

A method for wireless communications by a UE is described. The method may include receiving control signaling that schedules a set of resources for a shared channel transmission, where the set of resources indicates that a first TBS for the shared channel transmission exceeds a maximum TBS and communicating the shared channel transmission via the set of resources, where the shared channel transmission includes a set of multiple TBs associated with respective code blocks and respective CRC bits, and where a second TBS for each of the set of multiple TBs is based on the maximum TBS.

A UE for wireless communications is described. The UE may include one or more memories storing processor executable code, and one or more processors coupled with the one or more memories. The one or more processors may individually or collectively be operable to execute the code to cause the UE to receive control signaling that schedules a set of resources for a shared channel transmission, where the set of resources indicates that a first TBS for the shared channel transmission exceeds a maximum TBS and communicate the shared channel transmission via the set of resources, where the shared channel transmission includes a set of multiple TBs associated with respective code blocks and respective CRC bits, and where a second TBS for each of the set of multiple TBs is based on the maximum TBS.

Another UE for wireless communications is described. The UE may include means for receiving control signaling that schedules a set of resources for a shared channel transmission, where the set of resources indicates that a first TBS for the shared channel transmission exceeds a maximum TBS and means for communicating the shared channel transmission via the set of resources, where the shared channel transmission includes a set of multiple TBs associated with respective code blocks and respective CRC bits, and where a second TBS for each of the set of multiple TBs is based on the maximum TBS.

A non-transitory computer-readable medium storing code for wireless communications is described. The code may include instructions executable by one or more processors to receive control signaling that schedules a set of resources for a shared channel transmission, where the set of resources indicates that a first TBS for the shared channel transmission exceeds a maximum TBS and communicate the shared channel transmission via the set of resources, where the shared channel transmission includes a set of multiple TBs associated with respective code blocks and respective CRC bits, and where a second TBS for each of the set of multiple TBs is based on the maximum TBS.

Some examples of the method, user equipment (UEs), and non-transitory computer-readable medium described herein may further include operations, features, means, or instructions for communicating an indication of the maximum TBS, where communication of the shared channel transmission may be based on communication of the indication of the maximum TBS.

Some examples of the method, user equipment (UEs), and non-transitory computer-readable medium described herein may further include operations, features, means, or instructions for receiving, via the control signaling, an indication of a set of HARQ identifiers associated with a set of TB groups associated with the shared channel transmission, where each of the set of TB groups includes one or more of the set of multiple TBs.

Some examples of the method, user equipment (UEs), and non-transitory computer-readable medium described herein may further include operations, features, means, or instructions for receiving, via the control signaling, an indication of a first HARQ identifier associated with a first TB group of a set of TB groups, where each TB group of the set of TB groups includes one or more of the set of multiple TBs, and where respective HARQ identifiers for a remainder of the set of TB groups may be based on the first HARQ identifier.

Some examples of the method, user equipment (UEs), and non-transitory computer-readable medium described herein may further include operations, features, means, or instructions for receiving, via the control signaling, an indication of a HARQ identifier associated with the shared channel transmission and a quantity of acknowledgment bit fields associated with the HARQ identifier that correspond to a set of TB groups associated with the shared channel transmission, where each of the set of TB groups includes one or more of the set of multiple TBs.

Some examples of the method, user equipment (UEs), and non-transitory computer-readable medium described herein may further include operations, features, means, or instructions for receiving, via the control signaling, an indication of a set of TB groups associated with the shared channel transmission, where each of the set of TB groups includes one or more of the set of multiple TBs, transmitting a negative acknowledgement for a TB group of the set of TB groups, and updating a set of pages of a soft buffer of the UE based on transmission of the negative acknowledgement, where each page of the set of pages corresponds to a respective TB of the TB group, and where a page size for the soft buffer may be based on the maximum TBS.

In some examples of the method, user equipment (UEs), and non-transitory computer-readable medium described herein, purging, based on transmission of the negative acknowledgement, a second set of pages from the soft buffer of the UE, where a first quantity of pages of the set of pages may be equal to a second quantity of pages of the second set of pages.

Some examples of the method, user equipment (UEs), and non-transitory computer-readable medium described herein may further include operations, features, means, or instructions for transmitting, with the negative acknowledgement, an indication of a first HARQ identifier associated with the TB group, where the second set of pages may be associated with a second HARQ identifier.

In some examples of the method, user equipment (UEs), and non-transitory computer-readable medium described herein, the second TBS may be based on the first TBS divided by the maximum TBS.

A method for wireless communications by a network entity is described. The method may include outputting control signaling that schedules a set of resources for a shared channel transmission, where the set of resources indicates that a first TBS for the shared channel transmission exceeds a maximum TBS and communicating the shared channel transmission via the set of resources, where the shared channel transmission includes a set of multiple TBs associated with respective code blocks and respective CRC bits, and where a second TBS for each of the set of multiple TBs is based on the maximum TBS.

A network entity for wireless communications is described. The network entity may include one or more memories storing processor executable code, and one or more processors coupled with the one or more memories. The one or more processors may individually or collectively be operable to execute the code to cause the network entity to output control signaling that schedules a set of resources for a shared channel transmission, where the set of resources indicates that a first TBS for the shared channel transmission exceeds a maximum TBS and communicate the shared channel transmission via the set of resources, where the shared channel transmission includes a set of multiple TBs associated with respective code blocks and respective CRC bits, and where a second TBS for each of the set of multiple TBs is based on the maximum TBS.

Another network entity for wireless communications is described. The network entity may include means for outputting control signaling that schedules a set of resources for a shared channel transmission, where the set of resources indicates that a first TBS for the shared channel transmission exceeds a maximum TBS and means for communicating the shared channel transmission via the set of resources, where the shared channel transmission includes a set of multiple TBs associated with respective code blocks and respective CRC bits, and where a second TBS for each of the set of multiple TBs is based on the maximum TBS.

A non-transitory computer-readable medium storing code for wireless communications is described. The code may include instructions executable by one or more processors to output control signaling that schedules a set of resources for a shared channel transmission, where the set of resources indicates that a first TBS for the shared channel transmission exceeds a maximum TBS and communicate the shared channel transmission via the set of resources, where the shared channel transmission includes a set of multiple TBs associated with respective code blocks and respective CRC bits, and where a second TBS for each of the set of multiple TBs is based on the maximum TBS.

Some examples of the method, network entities, and non-transitory computer-readable medium described herein may further include operations, features, means, or instructions for communicating an indication of the maximum TBS, where communication of the shared channel transmission may be based on communication of the indication of the maximum TBS.

Some examples of the method, network entities, and non-transitory computer-readable medium described herein may further include operations, features, means, or instructions for outputting, via the control signaling, an indication of a set of HARQ identifiers associated with a set of TB groups associated with the shared channel transmission, where each of the set of TB groups includes one or more of the set of multiple TBs.

Some examples of the method, network entities, and non-transitory computer-readable medium described herein may further include operations, features, means, or instructions for outputting, via the control signaling, an indication of a first HARQ identifier associated with a first TB group of a set of TB groups, where each TB group of the set of TB groups includes one or more of the set of multiple TBs, and where respective HARQ identifiers for a remainder of the set of TB groups may be based on the first HARQ identifier.

Some examples of the method, network entities, and non-transitory computer-readable medium described herein may further include operations, features, means, or instructions for outputting, via the control signaling, an indication of a HARQ identifier associated with the shared channel transmission and a quantity of acknowledgment bit fields associated with the HARQ identifier that correspond to a set of TB groups associated with the shared channel transmission, where each of the set of TB groups includes one or more of the set of multiple TBs.

Some examples of the method, network entities, and non-transitory computer-readable medium described herein may further include operations, features, means, or instructions for outputting, via the control signaling, an indication of a set of TB groups associated with the shared channel transmission, where each of the set of TB groups includes one or more of the set of multiple TBs, obtaining, from a UE, a negative acknowledgement for a TB group of the set of TB groups, and determining a set of pages of a soft buffer of the UE that may be updated based on the negative acknowledgement, where each page of the set of pages corresponds to a respective TB of the TB group, and where a page size for the soft buffer may be based on the maximum TBS.

Some examples of the method, network entities, and non-transitory computer-readable medium described herein may further include operations, features, means, or instructions for determining, based on the negative acknowledgement, a second set of pages from that may be purged from the soft buffer of the UE, where a first quantity of pages of the set of pages may be equal to a second quantity of pages of the second set of pages.

Some examples of the method, network entities, and non-transitory computer-readable medium described herein may further include operations, features, means, or instructions for obtaining, with the negative acknowledgement, an indication of a first HARQ identifier associated with the TB group, where the second set of pages may be associated with a second HARQ identifier.

In some examples of the method, network entities, and non-transitory computer-readable medium described herein, the second TBS may be based on the first TBS divided by the maximum TBS.

BRIEF DESCRIPTION OF THE DRAWINGS

FIGS. 12 and 13 show flowcharts illustrating methods that support TBS and soft buffer management for shared channel transmissions in accordance with one or more aspects of the present disclosure.

DETAILED DESCRIPTION

Figure 1:
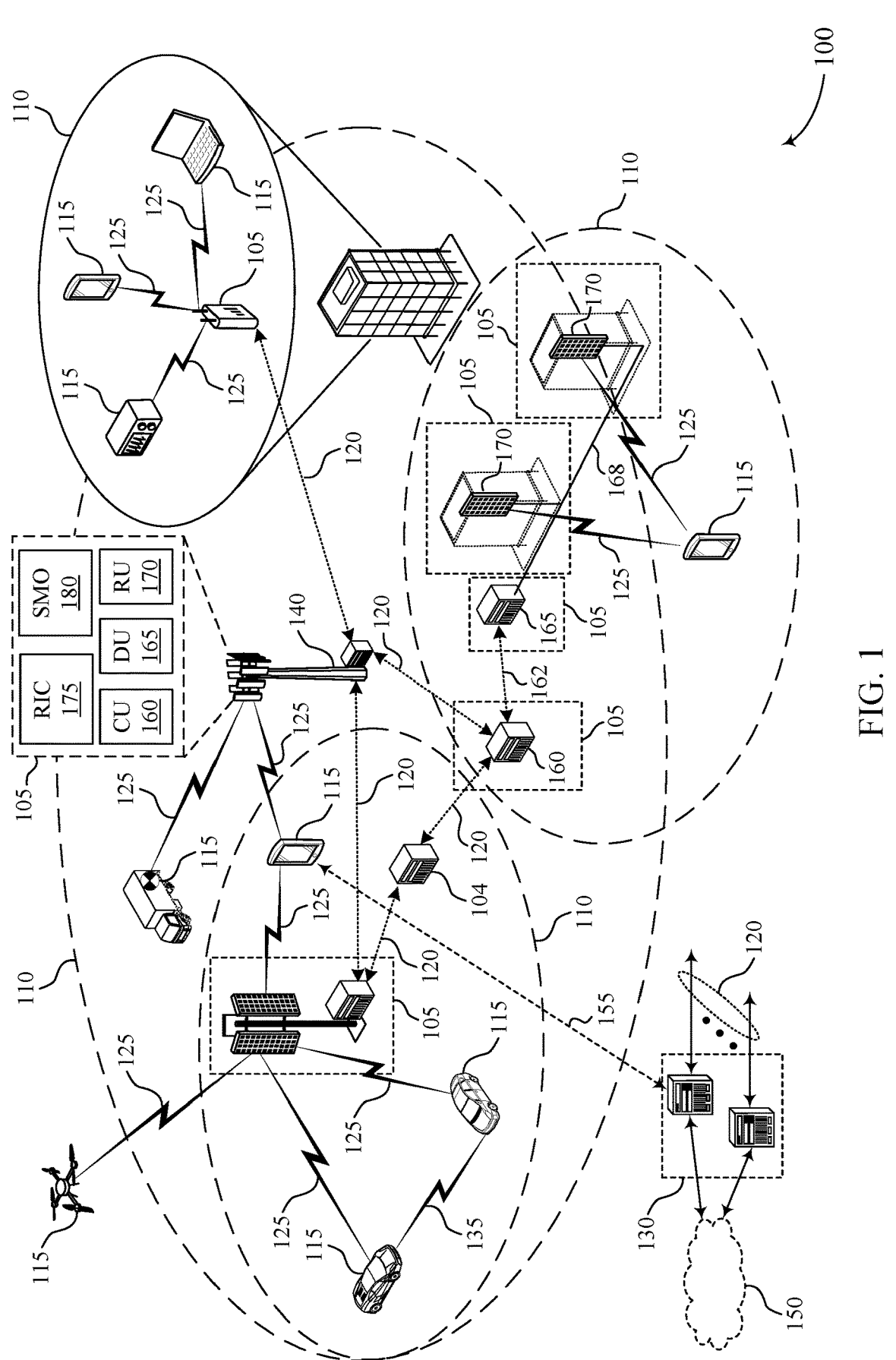
FIG. 1 shows an example of a wireless communications system that supports transport block (TB) size (TBS) and soft buffer management for shared channel transmissions in accordance with one or more aspects of the present disclosure.

A communication device, such as a user equipment (UE), may transmit or receive data as a transport block (TB) via a shared channel transmission (e.g., a physical uplink shared channel (PUSCH) or a physical downlink shared channel (PDSCH)). A TB may include a payload, which may carry a quantity of information bits. For example, the UE may receive a downlink control information (DCI) which schedules a set of resources for a shared channel for the UE to transmit or receive a TB. A shared channel transmission may be scheduled across slot boundaries. For example, a start and length indicator value (SLIV) in the DCI may schedule a long shared channel transmission across slots to reduce demodulation reference signal (DMRS) and control signal (e.g., physical downlink control channel (PDCCH)) overhead associated with the shared channel transmission. A UE may have a maximum TB size (TBS) the UE is able to manage, for example, based on hybrid automatic repeat request (HARQ) buffer sizes. The maximum TBS may be known to both the network and the UE (e.g., may be signaled in capability signaling or may be predefined or standardized). UEs may not support TBs having larger sizes than the maximum TBS, and accordingly, in some examples, a SLIV resulting in a TBS larger than the maximum TBS may not be supported.

In response to the TBS indicated by the scheduling information for a shared channel transmission being greater than the maximum TBS for a UE, the shared channel transmission may be split into multiple smaller TBs, each TB having a TBS that satisfies the maximum TBS. Code block segmentation and cyclic redundancy check (CRC) attachment may be done based on the smaller TBs. Accordingly, a UE may receive control signaling that schedules a shared channel transmission in a set of resources. If the set of resources indicates a TBS that exceeds the maximum TBS size, the UE may communicate the shared channel transmission (e.g., transmit a PUSCH or receive a PDSCH) having multiple TBs that satisfy the maximum TBS. Accordingly, the network entity and the UE may determine the TBS for each of multiple TBs. Further, TBs of the multiple TBs may be grouped such that different HARQ IDs or acknowledgment bits can be mapped to different groups of TBs of the multiple TBs. Thus, retransmission of TBs may be more granular than retransmission of the entire shared channel transmission.

The UE may perform techniques for soft buffering for combining retransmissions for reliable data transmissions. For example, a UE in a HARQ procedure may receive an initial transmission of TBs from a network entity. Information in the initial transmission may be encoded, and the UE may decode the received TBs to recover the information. If any TBs are not received or successfully decoded by the UE, the UE may store the received TBs in a buffer, which may be referred to as a soft buffer, for combining with TBs received in a retransmission. The UE may store and purge multiple pages from the soft buffer, where each page corresponds to a TB. The pages that are stored and purged may be stored and purged as a group based on groupings of TBs within a shared channel transmission. For example, TBs belonging to a same HARQ ID may be stored and purged as a group. The network entity may have knowledge of which TBs are stored and which TBs have been removed from the soft buffer, and thus, may know which TBs to transmit in a retransmission.

Aspects of the disclosure are initially described in the context of wireless communications systems. Aspects of the disclosure are further illustrated by and described with reference to process flows, apparatus diagrams, system diagrams, and flowcharts that relate to TBS and soft buffer management for shared channel transmissions.

FIG. 1 shows an example of a wireless communications system 100 that supports TBS and soft buffer management for shared channel transmissions in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB- MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/ (\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. HARQ feedback is one technique for increasing the likelihood that data is received correctly via a communication link (e.g., the communication link(s) 125, a D2D communication link 135). HARQ may include a combination of error detection (e.g., using a CRC), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 and a network entity 105 may communicate data as a TB via a shared channel (e.g., a PDSCH or a PUSCH). For example, the UE 115 may receive a DCI from a network entity 105 which schedules a set of resources for a shared channel transmission for the UE to transmit or receive a TB. In some examples, PUSCH transmissions may be repeated. For example, PUSCH transmissions may be repeated with multiple segments of back-to-back symbols to extend the PUSCH coverage. Repetitions may take different redundancy versions (RVs) and each segment may not cross a slot boundary. In some examples, a shared channel transmission may be scheduled across slot boundaries. For example, a SLIV in the DCI that schedules the shared channel transmission may schedule a long shared channel transmission across slots to reduce DMRS and control signal (e.g., PDCCH) overhead. For example, scheduling a shared channel transmission across slot boundaries may reduce DMRS overhead by applying a more uniform time domain DMRS pattern given Doppler (e.g., incorporating benefits from DMRS and cell specific reference signals). A UE 115 may have a maximum TBS the UE 115 is able to manage, for example, based on HARQ buffer sizes. The maximum TBS may be known to both the network and the UE 115. For example, the UE 115 may transmit capability signaling to a network entity 105 indicating the maximum TBS the UE 115 may support. UEs 115 may not support TBs having larger sizes than the maximum TBS. For example, if the SLIV is too long, the TBS may be too large for legacy TBS calculation and/or the UE 115 may not have a large enough HARQ buffer to support a large TBS. Capping a shared channel transmission size based on the TBS, however, may limit the quantity of information bits that may be delivered by a shared channel transmission.

Accordingly, when the TBS indicated by the scheduling information for a shared channel transmission is greater than the maximum TBS for a UE 115, the shared channel transmission may be split into multiple small TBs, each small TB having a TBS that satisfies the maximum TBS. Thus, for a long shared channel transmission (e.g., across slots), the total quantity of information bits and CRC bits may exceed the maximum TBS. Code block segmentation and CRC attachment may be per small TB. Accordingly, a UE 115 may receive control signaling that schedules a shared channel transmission in a set of resources. If the set of resources indicates a TBS that exceeds the maximum TBS size, the UE 115 may communicate the shared channel transmission (e.g., transmit a PUSCH or receive a PDSCH) having multiple TBs that each satisfy the maximum TBS for the UE 115. Further, TBs of the multiple TBs may be grouped such that different HARQ IDs or acknowledgment bits can be mapped to different groups of TBs of the multiple TBs. Accordingly, retransmission of TBs may be more granular than retransmission of the entire shared channel transmission.

The UE 115 may perform techniques for soft buffering for combining retransmissions for reliable data transmissions. For example, a UE in a HARQ procedure may receive an initial transmission of TBs from a network entity. Information in the initial transmission may be encoded, and the UE 115 may decode the received TBs to recover the information. If any TBs are not received or decoded by the UE 115 or the UE 115, the UE 115 may store the received TBs in a soft buffer for combining with TBs received in a retransmission. However, the memory for storage in the buffer of the UE may be limited, such that a limited quantity of TBs may be stored in the buffer. Accordingly, the UE 115 may purge pages in the soft buffer when storing new pages in the soft buffer to create space for the new pages. The pages that are stored and purged may be stored and purged as a group based on groupings of TBs within a shared channel transmission. For example, TBs belonging to a same HARQ ID may be stored and purged as a group. The network entity may have knowledge of which TBs are stored and which TBs have been removed from the soft buffer, for example, based on HARQ feedback, and thus, may know which TBs to transmit in a retransmission.

Figure 2:
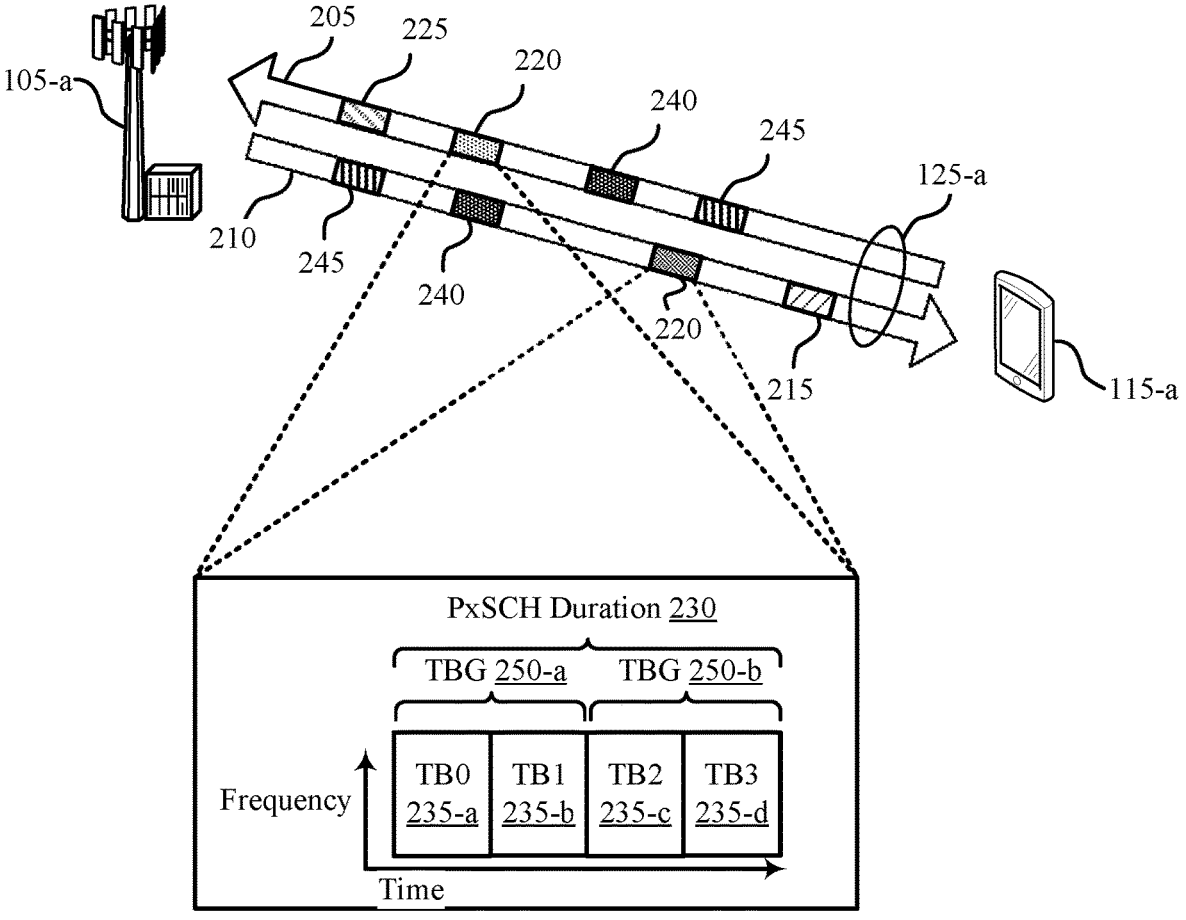
FIG. 2 shows an example of a wireless communications system that supports TBS and soft buffer management for shared channel transmissions in accordance with one or more aspects of the present disclosure.

FIG. 2 shows an example of a wireless communications system 200 that supports TBS and soft buffer management for shared channel transmissions in accordance with one or more aspects of the present disclosure. The wireless communications system 200 may implement aspects of or may be implemented by aspects of the wireless communications system 100. For example, the wireless communications system 200 includes a UE 115-*a* and a network entity 105-*a*, which may be examples of a UE 115 described with respect to FIG. 1.

The network entity 105-*a* may communicate with the UE 115-*a* via a communication link 125-*a*, which may be an example of an NR or LTE link between the UE 115-*a* and the network entity 105-*a*. In some cases, the communication link 125-*a* may include an example of an access link (e.g., a Uu link). The communication link 125-*a* may include a bi-directional link that enables both uplink and downlink communication. For example, the UE 115-*a* may transmit uplink signals 205, such as uplink control signals or uplink data signals, to the network entity 105-*a* using the communication link 125-*a*, and the network entity 105-*a* may transmit downlink signals 210, such as downlink control signals or downlink data signals, to the UE 115-*a* using the communication link 125-*a*.

As described herein, the network entity 105-*a* may transmit control signaling 215 (e.g., in a DCI via a PDCCH) to the UE 115-*a* that schedules a set of resources (e.g., time and frequency resources) for a shared channel transmission 220 (e.g., a PDSCH or a PUSCH). In some examples, the control signaling 215 may be transmitted by the UE 115-*a* to the network entity 105-*a* (e.g., in uplink control information (UCI) via a physical uplink control channel (PUCCH)). The UE 115-*a* may have a maximum TBS the UE 115-*a* is able to manage, for example, based on HARQ buffer sizes of the UE 115-*a*. The maximum TBS for the UE 115-*a* may be known to both the network entity 105-*a* and the UE 115-*a*. For example, the UE 115-*a* may transmit capability signaling 225 to the network entity 105-*a* indicating the maximum TBS that the UE 115-*a* may support. The maximum TBS for the UE 115-*a* may be referred to as $TBS_{cap}$. The set of resources indicated by the control signaling 215 may indicate a duration 230 of the shared channel transmission 220 that exceeds the maximum TBS for the UE 115-*a*. For example, the SLIV in the control signaling 215 may schedule the shared channel transmission 220 across slots to save on DMRS and PDCCH overhead. For example, using a single DCI (e.g., the control signaling 215) to schedule the shared channel transmission across multiple slots may reduce the amount of control resources (e.g., PDCCH overhead) as compared to transmitting a separate DCI to schedule a shared channel transmission in each slot.

The shared channel transmission 220 may be divided into multiple small TBs 235 that each satisfy the maximum TBS for the UE 115-*a* (e.g., do not exceed the maximum TBS for the UE 115-*a*). For example, if the TBS calculated by the SLIV indicated in the control signaling 215 (referred to as $TBS_{calculated}$) exceeds $TBS_{cap}$, then the indicated set of resources for the shared channel transmission 220 may be partitioned (e.g., evenly partitioned) into M=TBScalculated/TBScap subsets of resources, and each subset of resources may be assigned to one small TB 235. For example, as shown in FIG. 2, the set of resources assigned for the shared channel transmission 220 may be divided into subsets of resources for the small TB0 235-*a*, the small TB1 235-*b*, the small TB2 235-*c*, and the small TB3 235-*d*. The TBS for each of the small TBs 235 may be calculated based on the partitioned resources (e.g., the quantity of resources in each of the subsets of resources). Code block segmentation for the data bits and CRC attachment may be per small TB 235.

In some examples, the UE 115-*a* may transmit a report 240 to the network entity 105-*a* indicating HARQ feedback for the shared channel transmission 220 (e.g., if the shared channel transmission 220 is a PDSCH) or the network entity 105-*a* may transmit a report 240 to the UE 115-*a* indicating HARQ feedback for the shared channel transmission 220 (e.g., if the shared channel transmission 220 is a PUSCH). For multiple small TBs 235 transmitted in a shared channel transmission 220, the transmitting device (e.g., the network entity 105-*a* for a PDSCH or the UE 115-*a* for a PUSCH) may retransmit one or more small TBs 235 in a retransmission 245 that the report 240 indicates were not successfully received or decoded by the receiving device (e.g., the network entity 105-*a* for a PUSCH or the UE 115-*a* for a PDSCH). Accordingly, small TBs 235 within the shared channel transmission 220 may be associated with different HARQ identifiers (IDs).

In some examples, contiguous small TBs 235 in a shared channel transmission 220 may be grouped as a TB group (TBG) 250 and different TBGs 250 may be associated with different HARQ IDs. For example, the small TB0 235-*a* and the small TB1 235-*b may form a first TBG 250**-*a*, and the small TB2 235-*c* and the small TB3 235-*d* may form a second TBG 250-*b*. In some examples, the control signaling 215 may indicate the HARQ IDs associated with the different TBGs 250. In some examples, each TBG 250 may be associated with one acknowledgment (ACK)/negative ACK (NACK) bit in the HARQ feedback in the report 240. If a NACK is received in the report 240, the transmitting device may retransmit in the retransmission 245 the associated TBG 250. In some cases, each small TB 235 may be associated with a respective HARQ ID (e.g., each small TB 235 may form its own TBG).

In some examples, the control signaling 215 that scheduled the shared channel transmission 220 may indicate the HARQ ID for the temporally first TBG 250 (e.g., the first TBG 250-*a*) and the HARQ IDs for the remaining TBGs 250 may be derived from the first HARQ ID (e.g., based on predefined rules). For example, incremental HARQ IDs with modulo operation with respect to the total quantity of HARQ IDs may be assigned to the remaining TBSs 250. In some examples, the control signaling 215 may indicate the quantity of TBGs 250 within the shared channel transmission 220.

In some examples, different HARQ IDs may not be associated to the different TBGs 250 within the shared channel transmission, and the different TBGs 250 may be mapped to multiple HARQ ACK/NACK bits associated with a same HARQ ID for the shared channel transmission 220. For example, each ACK/NACK bit may control retransmission of one TBG 250. For example, the report may include a bitmap with a bit corresponding to each TBG 250.

In some examples, the UE 115-*a* may maintain a soft buffer for downlink communications (e.g., where the shared channel transmission 220 is a PDSCH). For example, the UE 115-*a* may use a soft buffer to store the log likelihood ratio (LLR) for downlink transport blocks to support soft combining in retransmission. The soft buffer may be a limited resource as there may be a cost associated with the memory used for the soft buffer. Additionally, there may be power implications to maintain the memory used for the soft buffer at the UE 115-*a* (e.g., as compared to turning off the memory used for the soft buffer at the UE 115-*a*). A soft buffer saving techniques may include maintaining fewer soft buffer pages than the quantity of HARQ processes that the network entity 105-*a* may use. The quantity of soft buffer pages to maintain may be a UE implementation, and the UE 115-*a* may determine for which HARQ processes to drop the soft buffer. In some examples, the network entity 105-*a* may not be informed of which TB that is NACKed (e.g., in the report 240) will remain in the soft buffer of the UE 115-*a*.

In some examples, however, the UE 115-*a* and the network entity 105-*a* may have a common understanding as to the soft buffer management for TBGs 250 so that the network entity 105-*a* may predict which TBGs the UE 115-*a* will maintain in the soft buffer so that the network entity 105-*a* may determine which TBs to transmit in a retransmission. In some examples, one page of soft buffer at the UE 115-*a* may correspond to one TB and one HARQ process (e.g., one HARQ ID). In some examples, however, as described herein, multiple TBs may be bundled as a TBG 250 for one HARQ process. The soft buffer size may be determined by the maximum TBS, and thus a TBG 250 may occupy multiple pages of soft buffer at the UE 115-*a*. In some examples, for a TBG 250 which includes N small TBs 235, the TBG may occupy N pages of soft buffer at the UE 115-*a*. The network entity 105-*a* may have a common understanding with the UE 115-*a* of the granularity of keeping or purging pages in the soft buffer. For example, for the HARQ process associated with a TBG 250, a NACK may correspond to multiple pages (e.g., as a NACK may be for one TBG 250 which may include multiple small TBs 235 each corresponding to one page), and accordingly a NACK may involve purging correspondingly multiple pages from the soft buffer. Thus, a NACK for a TBG may purge more pages than a NACK for a single TB (e.g., where each TB corresponds to one HARQ process).

In some examples, a NACK of the HARQ ID associated with a TBG 250 may mean that multiple pages may be occupied in the soft buffer of the UE 115-*a* corresponding to the multiple small TBs 235 in the TBG 250. For example, if the NACK is received by the network entity 105-*a* in the report 240 for a given TBG 250, that may mean that the UE 115-*a* may maintain all of the LLRs for the given TBG 250 in the soft buffer for combining with the retransmission 245 for that given TBG 250. For a TBG 250 with N small TBs 235, N pages may be loaded into the soft buffer of the UE 115-*a* and accordingly N pages associated with other HARQ processes may be purged from the soft buffer of the UE 115-*a* (e.g., to make room for the new N pages).

In some examples, soft buffer pages associated with the same HARQ IDs may be kept in or purged from the soft buffer of the UE 115-*a* as a whole unit. For example, when a HARQ ID is associated with N pages, the N pages may be kept or purged all together, thereby allowing the network entity 105-*a* to infer the soft buffer usage of the UE 115-*a* from the ACK/NACK reporting as pages may be kept or purged based on associated HARQ IDs.

Figure 3:
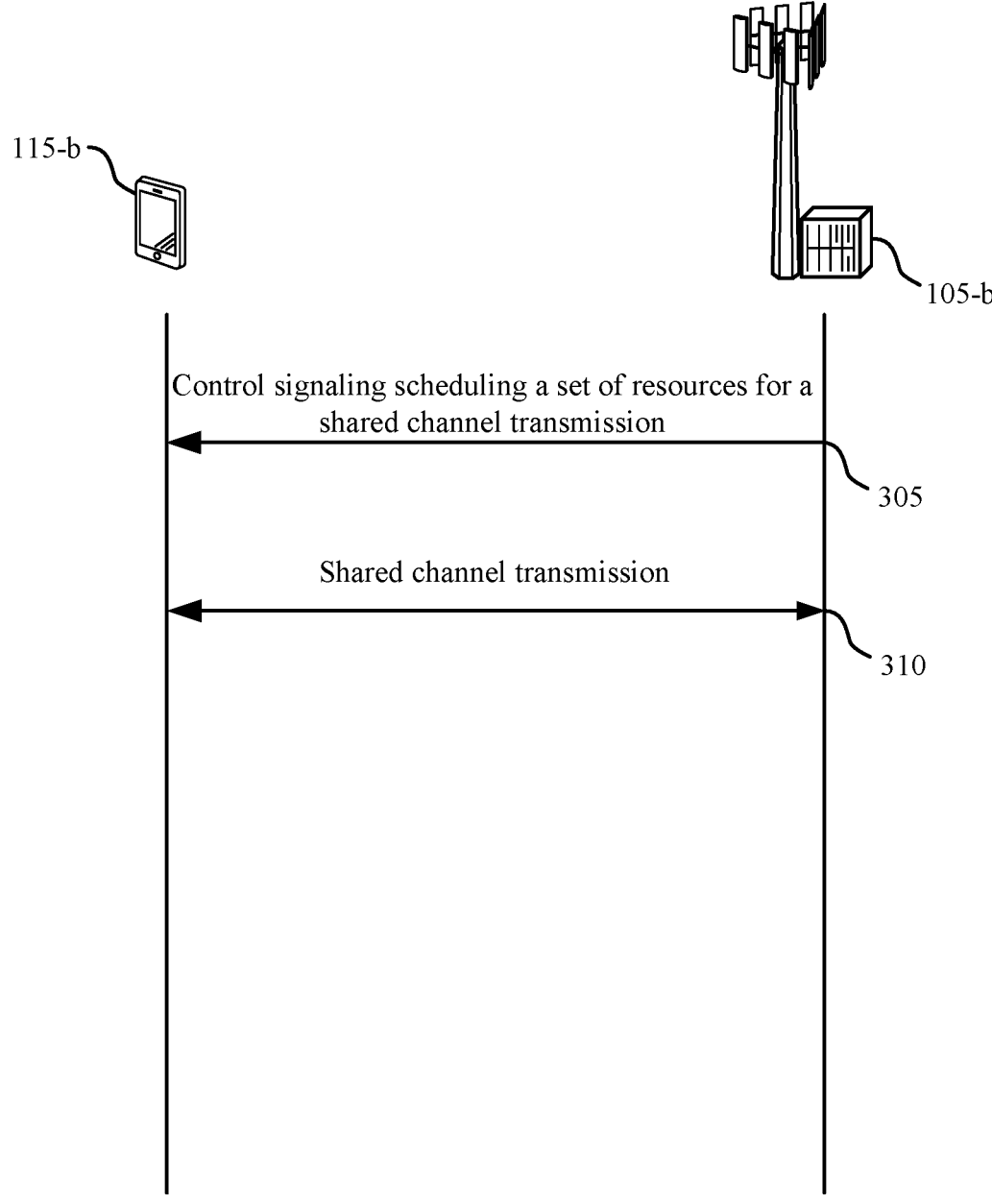
FIG. 3 shows an example of a process flow that supports TBS and soft buffer management for shared channel transmissions in accordance with one or more aspects of the present disclosure.

FIG. 3 shows an example of a process flow 300 that supports TBS and soft buffer management for shared channel transmissions in accordance with one or more aspects of the present disclosure. In some examples, the process flow 300 may implement or may be implemented by aspects of the wireless communications system 100, or the wireless communications system 200. The process flow 300 may include a UE 115-*b* and a network entity 105-*b*, which may be examples of a UE 115 and a network entity 105 as described herein. In the following description of the process flow 300, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 300, and other operations may be added to the process flow 300.

At 305, the UE 115-*b* may receive, from the network entity 105-*b*, control signaling that schedules a set of resources for a shared channel transmission. The set of resources may indicate that a first TBS for the shared channel transmission exceeds a maximum TBS for the UE 115-*b*.

At 310, the UE 115-*b* may communicate, with the network entity 105-*b*, the shared channel transmission via the set of resources. The shared channel transmission may include a set of multiple TBs associated with respective code blocks and respective CRC bits, and a second TBS for each of the set of multiple TBs may be based on the maximum TBS. In some examples, the second TBS is based at least in part on the first TBS divided by the maximum TBS. For example, if TBS calculated by the SLIV indicated in the control signaling 215 (referred to as $TBS_{calculated}$ of the first TBS) exceeds $TBS_{cap}$ (e.g., the maximum TBS for the UE 115-*b*), then the indicated set of resources for the shared channel transmission may be partitioned (e.g., evenly partitioned) into $$M = \frac{TBScalculated}{TBScap}$$

subsets of resources, and each subset of resources may be assigned to one small TB, and the TBS for each small TB (e.g., the second TBS) may be calculated based on the partitioned subsets.

In some examples, the UE 115-*b* may communicate, with the network entity 105-*b*, an indication of the maximum TBS, and communication of the shared channel transmission may be based on communication of the indication of the maximum TBS. For example, the UE 115-*b* may transmit capability signaling to the network entity 105-*b* indicating the maximum TBS for the UE 115-*b*. In some examples, the maximum TBS may be predefined or standardized.

In some examples, the UE 115-*b* may receive, via the control signaling, an indication of a set of HARQ IDs associated with a set of TBGs associated with the shared channel transmission, and each of the set of TBGs may include one or more of sets of multiple TBs.

In some examples, the UE 115-*b* may receive, via the control signaling, an indication of a first HARQ ID associated with a first TBG of a set of TBGs, each TBG of the set of TBGs may include one or more of sets of multiple TBs, and respective HARQ IDs for a remainder of the set of TBGs may be based on the first HARQ ID.

In some examples, the UE 115-*b* may receive, via the control signaling, an indication of a HARQ ID associated with the shared channel transmission and a quantity of acknowledgment bit fields associated with the HARQ ID that correspond to a set of TBGs associated with the shared channel transmission, and each of the set of TBGs may include one or more of sets of multiple TBs.

In some examples, the UE 115-*b* may receive, via the control signaling, an indication of a set of TBGs associated with the shared channel transmission, where each of the set of TBGs includes one or more of sets of multiple TBs. The UE 115-*b* may transmit, to the network entity 105-*b*, a negative acknowledgment for a TBG of the set of TBGs. The UE 115-*b* may update a set of pages of a soft buffer of the UE 115-*b* based on transmission of the negative acknowledgment, where each page of the set of pages corresponds to a respective TB of the TBG, and where a page size for the soft buffer is based on the maximum TBS. The network entity 105-*b* may correspondingly determine the set of pages of the soft buffer of the UE 115-*b* based on reception of the negative acknowledgment. In some examples, the UE 115-*b* may transmit to the network entity 105-*b* with the negative acknowledgment, an indication of a first HARQ ID associated with the TBG, and the second set of pages may be associated with a second HARQ ID.

Figure 4:
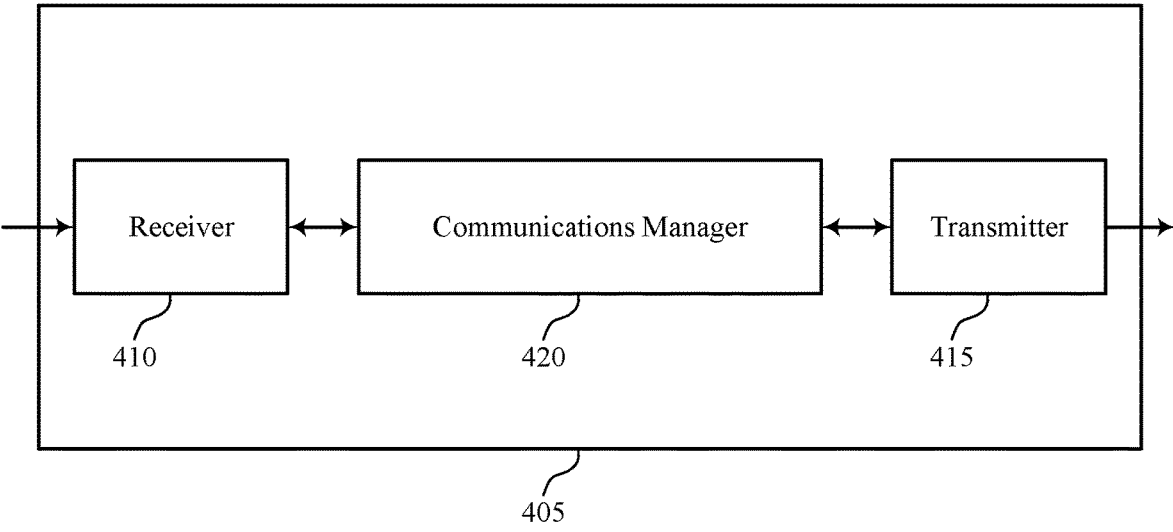
FIGS. 4 and 5 show block diagrams of devices that support TBS and soft buffer management for shared channel transmissions in accordance with one or more aspects of the present disclosure.

FIG. 4 shows a block diagram 400 of a device 405 that supports TBS and soft buffer management for shared channel transmissions in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to TBS and soft buffer management for shared channel transmissions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to TBS and soft buffer management for shared channel transmissions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of TBS and soft buffer management for shared channel transmissions as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving control signaling that schedules a set of resources for a shared channel transmission, where the set of resources indicates that a first TBS for the shared channel transmission exceeds a maximum TBS. The communications manager 420 is capable of, configured to, or operable to support a means for communicating the shared channel transmission via the set of resources, where the shared channel transmission includes a set of multiple TBs associated with respective code blocks and respective CRC bits, and where a second TBS for each of the set of multiple TBs is based on the maximum TBS.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for more efficient utilization of communication resources.

Figure 5:
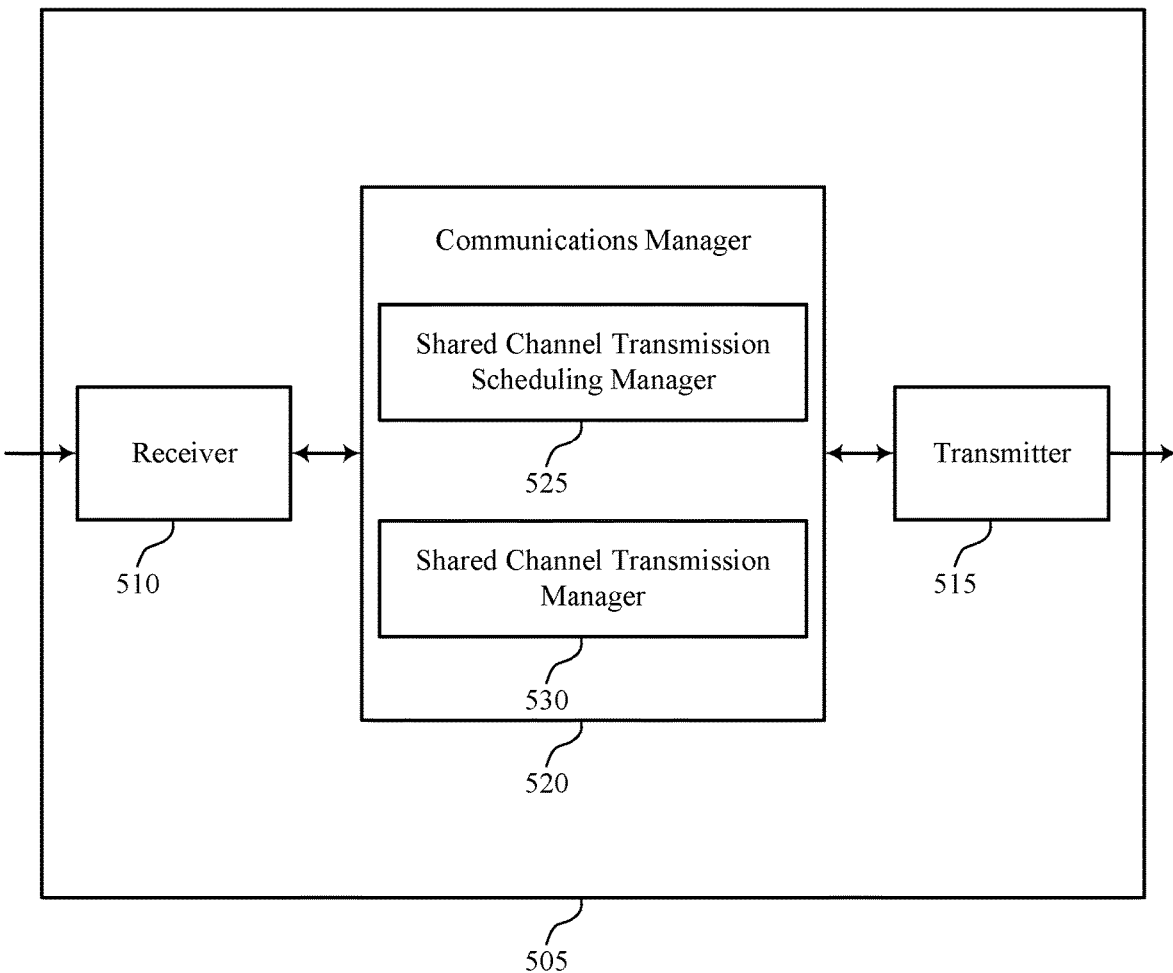

FIG. 5 shows a block diagram 500 of a device 505 that supports TBS and soft buffer management for shared channel transmissions in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to TBS and soft buffer management for shared channel transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to TBS and soft buffer management for shared channel transmissions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of TBS and soft buffer management for shared channel transmissions as described herein. For example, the communications manager 520 may include a shared channel transmission scheduling manager 525 a shared channel transmission manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The shared channel transmission scheduling manager 525 is capable of, configured to, or operable to support a means for receiving control signaling that schedules a set of resources for a shared channel transmission, where the set of resources indicates that a first TBS for the shared channel transmission exceeds a maximum TBS. The shared channel transmission manager 530 is capable of, configured to, or operable to support a means for communicating the shared channel transmission via the set of resources, where the shared channel transmission includes a set of multiple TBs associated with respective code blocks and respective CRC bits, and where a second TBS for each of the set of multiple TBs is based on the maximum TBS.

Figure 6:
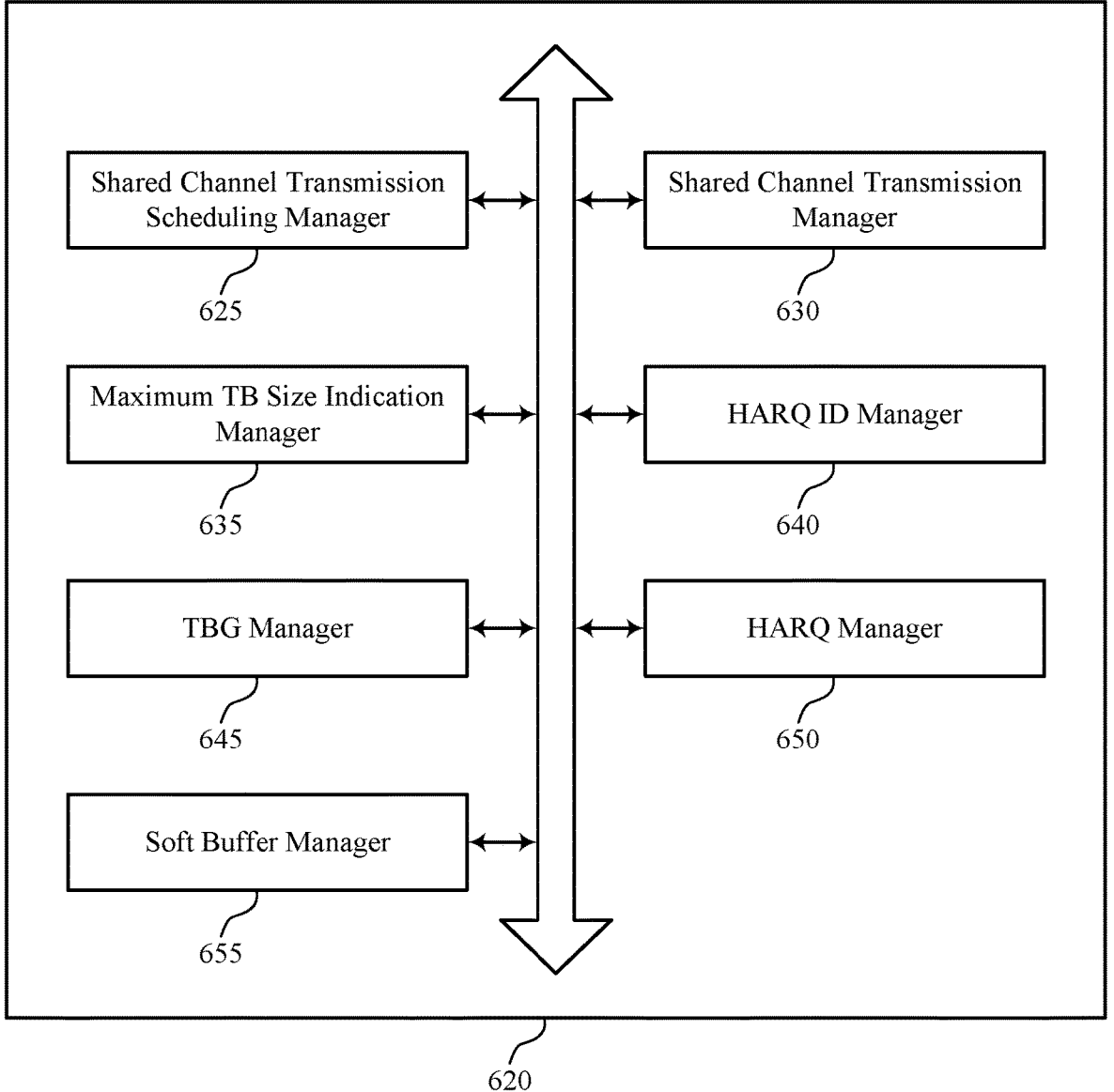
FIG. 6 shows a block diagram of a communications manager that supports TBS and soft buffer management for shared channel transmissions in accordance with one or more aspects of the present disclosure.

FIG. 6 shows a block diagram 600 of a communications manager 620 that supports TBS and soft buffer management for shared channel transmissions in accordance with one or more aspects of the present disclosure. The communications manager 620 may be an example of aspects of a communications manager 420, a communications manager 520, or both, as described herein. The communications manager 620, or various components thereof, may be an example of means for performing various aspects of TBS and soft buffer management for shared channel transmissions as described herein. For example, the communications manager 620 may include a shared channel transmission scheduling manager 625, a shared channel transmission manager 630, a maximum TB size indication manager 635, an HARQ ID manager 640, a TBG manager 645, an HARQ manager 650, a soft buffer manager 655, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The shared channel transmission scheduling manager 625 is capable of, configured to, or operable to support a means for receiving control signaling that schedules a set of resources for a shared channel transmission, where the set of resources indicates that a first TBS for the shared channel transmission exceeds a maximum TBS. The shared channel transmission manager 630 is capable of, configured to, or operable to support a means for communicating the shared channel transmission via the set of resources, where the shared channel transmission includes a set of multiple TBs associated with respective code blocks and respective CRC bits, and where a second TBS for each of the set of multiple TBs is based on the maximum TBS.

In some examples, the maximum TB size indication manager 635 is capable of, configured to, or operable to support a means for communicating an indication of the maximum TBS, where communication of the shared channel transmission is based on communication of the indication of the maximum TBS.

In some examples, the HARQ ID manager 640 is capable of, configured to, or operable to support a means for receiving, via the control signaling, an indication of a set of HARQ IDs associated with a set of TBGs associated with the shared channel transmission, where each of the set of TBGs includes one or more of the set of multiple TBs.

In some examples, the HARQ ID manager 640 is capable of, configured to, or operable to support a means for receiving, via the control signaling, an indication of a first HARQ ID associated with a first TBG of a set of TBGs, where each TBG of the set of TBGs includes one or more of the set of multiple TBs, and where respective HARQ IDs for a remainder of the set of TBGs are based on the first HARQ ID.

In some examples, the HARQ ID manager 640 is capable of, configured to, or operable to support a means for receiving, via the control signaling, an indication of a HARQ ID associated with the shared channel transmission and a quantity of acknowledgment bit fields associated with the HARQ ID that correspond to a set of TBGs associated with the shared channel transmission, where each of the set of TBGs includes one or more of the set of multiple TBs.

In some examples, the TBG manager 645 is capable of, configured to, or operable to support a means for receiving, via the control signaling, an indication of a set of TBGs associated with the shared channel transmission, where each of the set of TBGs includes one or more of the set of multiple TBs. In some examples, the HARQ manager 650 is capable of, configured to, or operable to support a means for transmitting a negative acknowledgment for a TBG of the set of TBGs. In some examples, the soft buffer manager 655 is capable of, configured to, or operable to support a means for updating a set of pages of a soft buffer of the UE based on transmission of the negative acknowledgment, where each page of the set of pages corresponds to a respective TB of the TBG, and where a page size for the soft buffer is based on the maximum TBS.

In some examples, the soft buffer manager 655 is capable of, configured to, or operable to support a means for purging, based on transmission of the negative acknowledgment, a second set of pages from the soft buffer of the UE, where a first quantity of pages of the set of pages is equal to a second quantity of pages of the second set of pages.

In some examples, the HARQ manager 650 is capable of, configured to, or operable to support a means for transmitting, with the negative acknowledgment, an indication of a first HARQ ID associated with the TBG, where the second set of pages are associated with a second HARQ ID.

In some examples, the second TBS is based on the first TBS divided by the maximum TBS.

Figure 7:
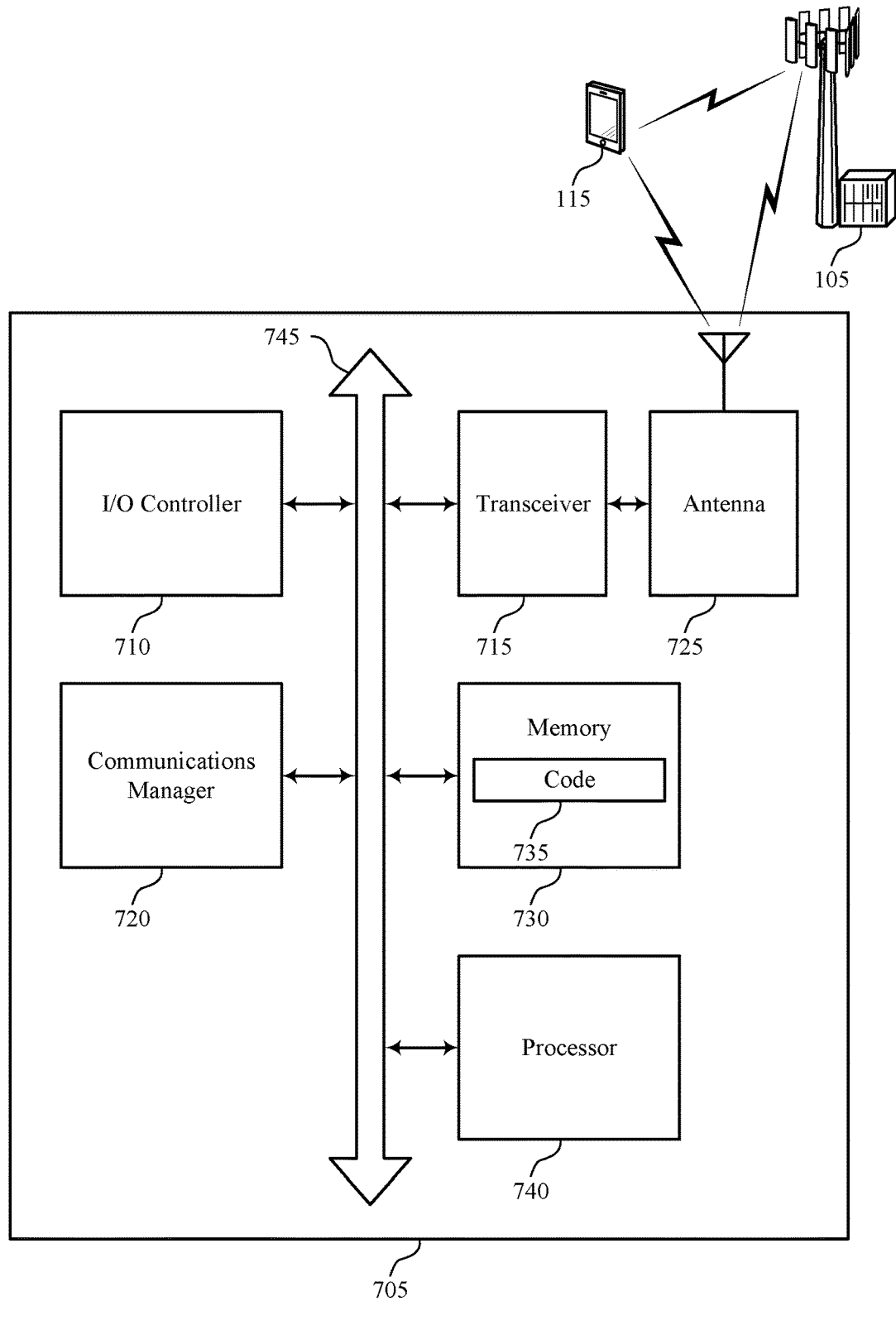
FIG. 7 shows a diagram of a system including a device that supports TBS and soft buffer management for shared channel transmissions in accordance with one or more aspects of the present disclosure.

FIG. 7 shows a diagram of a system 700 including a device 705 that supports TBS and soft buffer management for shared channel transmissions in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting TBS and soft buffer management for shared channel transmissions). For example, the device 705 or a component of the device 705 may include at least one processor 740 and at least one memory 730 coupled with or to the at least one processor 740, the at least one processor 740 and the at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving control signaling that schedules a set of resources for a shared channel transmission, where the set of resources indicates that a first TBS for the shared channel transmission exceeds a maximum TBS. The communications manager 720 is capable of, configured to, or operable to support a means for communicating the shared channel transmission via the set of resources, where the shared channel transmission includes a set of multiple TBs associated with respective code blocks and respective CRC bits, and where a second TBS for each of the set of multiple TBs is based on the maximum TBS.

By including or configuring the communications manager 720 in accordance with examples as described herein, the device 705 may support techniques for more efficient utilization of communication resources, improved coordination between devices, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of TBS and soft buffer management for shared channel transmissions as described herein, or the at least one processor 740 and the at least one memory 730 may be otherwise configured to, individually or collectively, perform or support such operations.

Figure 8:
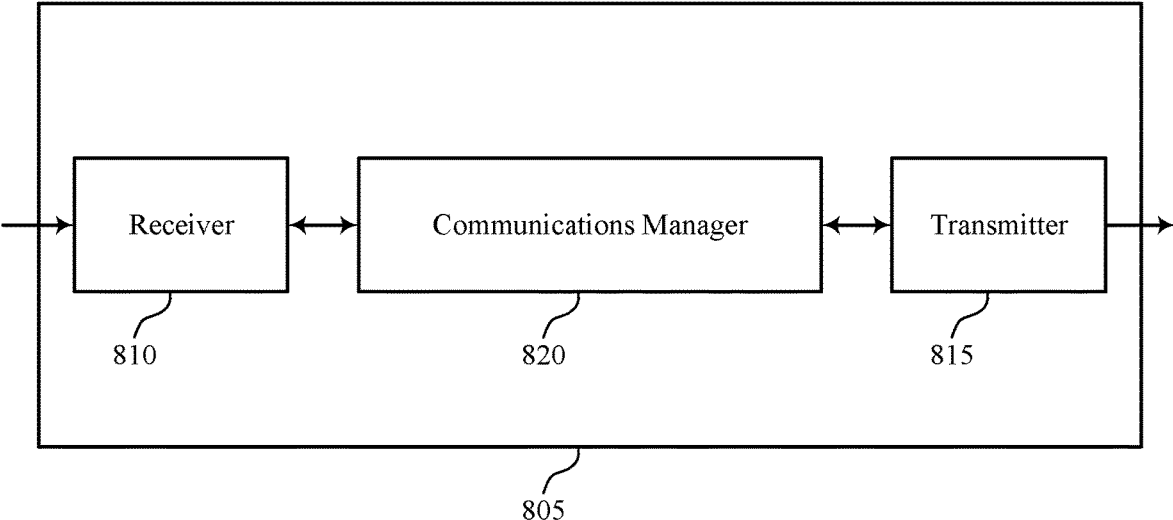
FIGS. 8 and 9 show block diagrams of devices that support TBS and soft buffer management for shared channel transmissions in accordance with one or more aspects of the present disclosure.

FIG. 8 shows a block diagram 800 of a device 805 that supports TBS and soft buffer management for shared channel transmissions in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations or components thereof may be examples of means for performing various aspects of TBS and soft buffer management for shared channel transmissions as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for outputting control signaling that schedules a set of resources for a shared channel transmission, where the set of resources indicates that a first TBS for the shared channel transmission exceeds a maximum TBS. The communications manager 820 is capable of, configured to, or operable to support a means for communicating the shared channel transmission via the set of resources, where the shared channel transmission includes a set of multiple TBs associated with respective code blocks and respective CRC bits, and where a second TBS for each of the set of multiple TBs is based on the maximum TBS.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for more efficient utilization of communication resources.

Figure 9:
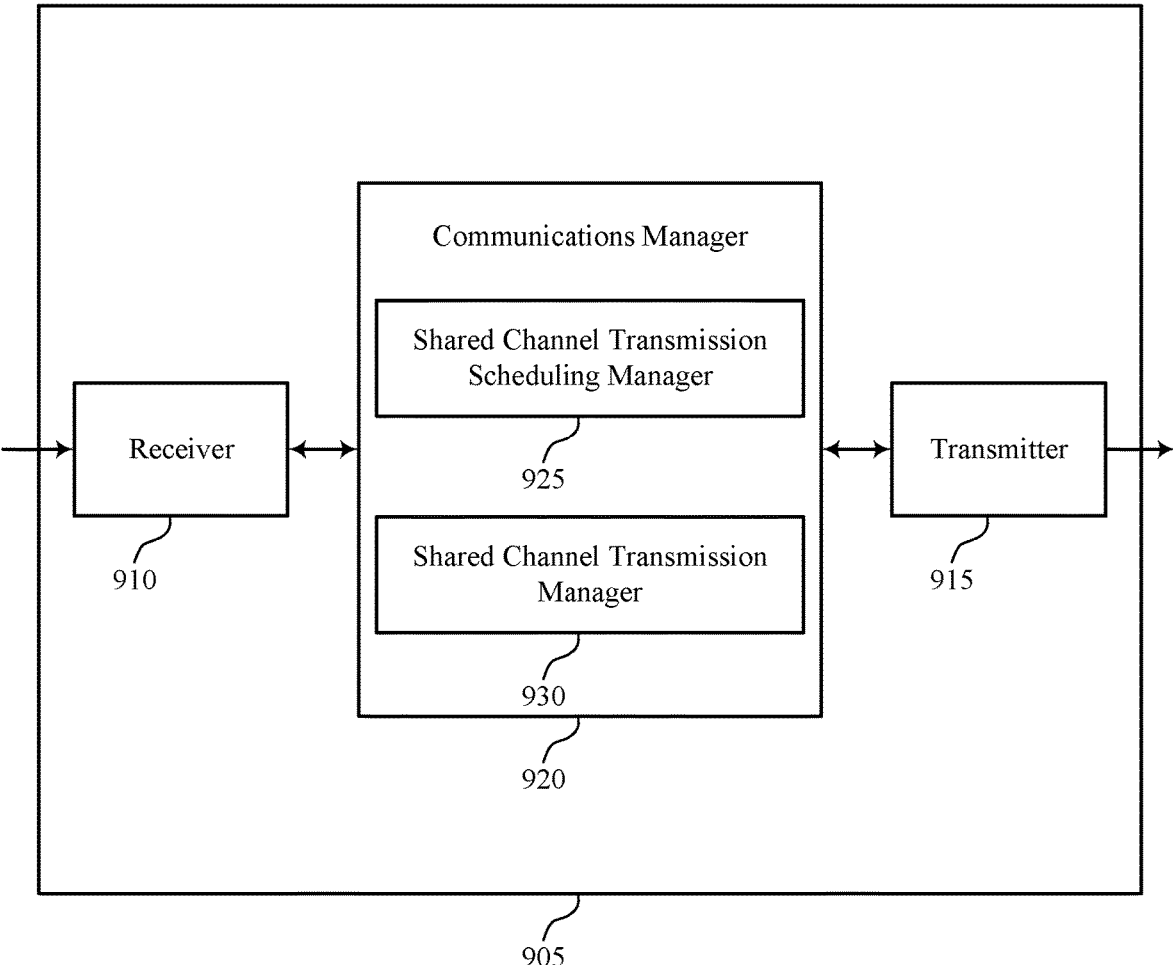

FIG. 9 shows a block diagram 900 of a device 905 that supports TBS and soft buffer management for shared channel transmissions in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of TBS and soft buffer management for shared channel transmissions as described herein. For example, the communications manager 920 may include a shared channel transmission scheduling manager 925 a shared channel transmission manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The shared channel transmission scheduling manager 925 is capable of, configured to, or operable to support a means for outputting control signaling that schedules a set of resources for a shared channel transmission, where the set of resources indicates that a first TBS for the shared channel transmission exceeds a maximum TBS. The shared channel transmission manager 930 is capable of, configured to, or operable to support a means for communicating the shared channel transmission via the set of resources, where the shared channel transmission includes a set of multiple TBs associated with respective code blocks and respective CRC bits, and where a second TBS for each of the set of multiple TBs is based on the maximum TBS.

Figure 10:
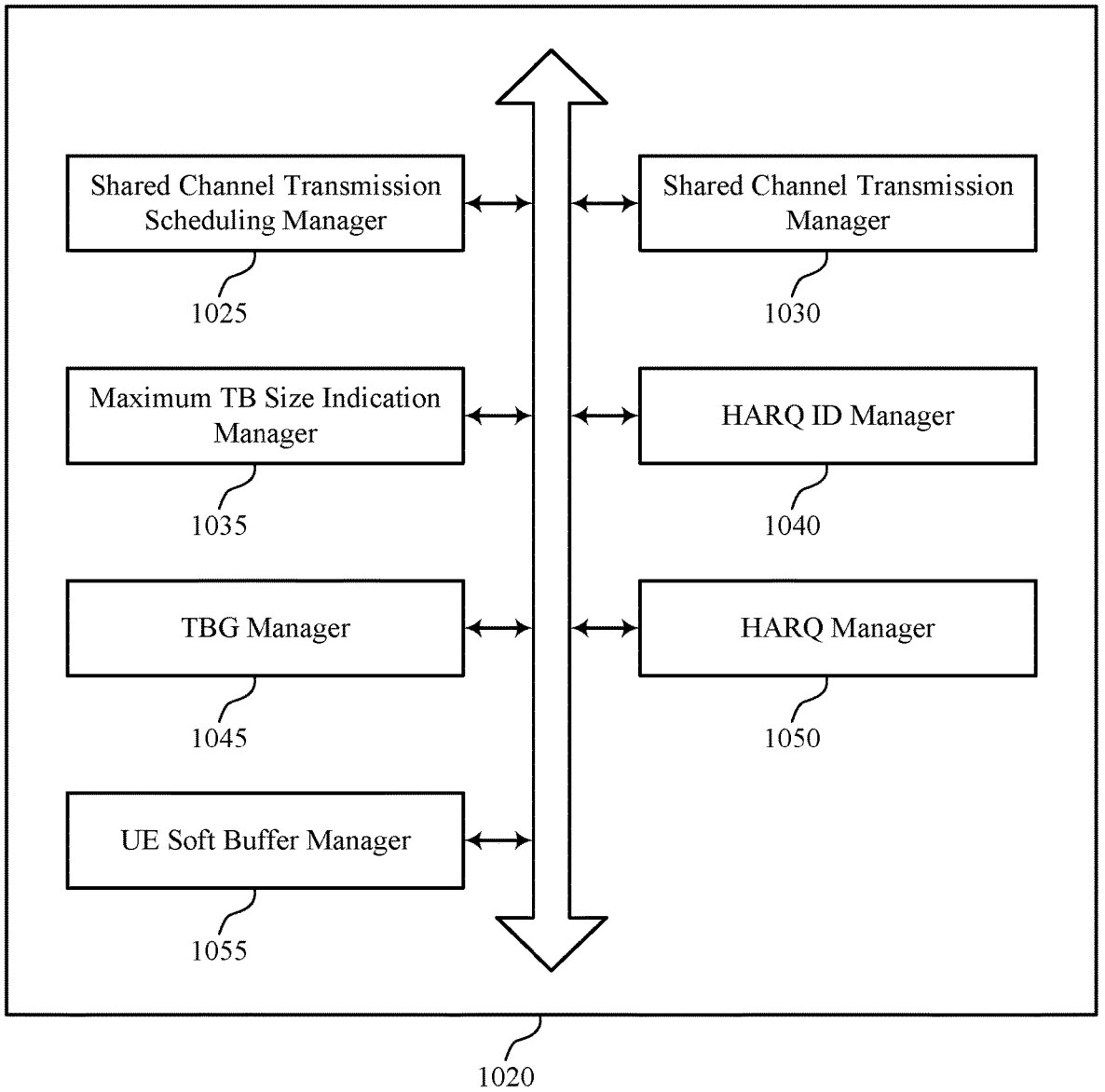
FIG. 10 shows a block diagram of a communications manager that supports TBS and soft buffer management for shared channel transmissions in accordance with one or more aspects of the present disclosure.

FIG. 10 shows a block diagram 1000 of a communications manager 1020 that supports TBS and soft buffer management for shared channel transmissions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of TBS and soft buffer management for shared channel transmissions as described herein. For example, the communications manager 1020 may include a shared channel transmission scheduling manager 1025, a shared channel transmission manager 1030, a maximum TB size indication manager 1035, an HARQ ID manager 1040, a TBG manager 1045, an HARQ manager 1050, a UE soft buffer manager 1055, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The shared channel transmission scheduling manager 1025 is capable of, configured to, or operable to support a means for outputting control signaling that schedules a set of resources for a shared channel transmission, where the set of resources indicates that a first TBS for the shared channel transmission exceeds a maximum TBS. The shared channel transmission manager 1030 is capable of, configured to, or operable to support a means for communicating the shared channel transmission via the set of resources, where the shared channel transmission includes a set of multiple TBs associated with respective code blocks and respective CRC bits, and where a second TBS for each of the set of multiple TBs is based on the maximum TBS.

In some examples, the maximum TB size indication manager 1035 is capable of, configured to, or operable to support a means for communicating an indication of the maximum TBS, where communication of the shared channel transmission is based on communication of the indication of the maximum TBS.

In some examples, the HARQ ID manager 1040 is capable of, configured to, or operable to support a means for outputting, via the control signaling, an indication of a set of HARQ IDs associated with a set of TBGs associated with the shared channel transmission, where each of the set of TBGs includes one or more of the set of multiple TBs.

In some examples, the HARQ ID manager 1040 is capable of, configured to, or operable to support a means for outputting, via the control signaling, an indication of a first HARQ ID associated with a first TBG of a set of TBGs, where each TBG of the set of TBGs includes one or more of the set of multiple TBs, and where respective HARQ IDs for a remainder of the set of TBGs are based on the first HARQ ID.

In some examples, the HARQ ID manager 1040 is capable of, configured to, or operable to support a means for outputting, via the control signaling, an indication of a HARQ ID associated with the shared channel transmission and a quantity of acknowledgment bit fields associated with the HARQ ID that correspond to a set of TBGs associated with the shared channel transmission, where each of the set of TBGs includes one or more of the set of multiple TBs.

In some examples, the TBG manager 1045 is capable of, configured to, or operable to support a means for outputting, via the control signaling, an indication of a set of TBGs associated with the shared channel transmission, where each of the set of TBGs includes one or more of the set of multiple TBs. In some examples, the HARQ manager 1050 is capable of, configured to, or operable to support a means for obtaining, from a UE, a negative acknowledgment for a TBG of the set of TBGs. In some examples, the UE soft buffer manager 1055 is capable of, configured to, or operable to support a means for determining a set of pages of a soft buffer of the UE that are updated based on the negative acknowledgment, where each page of the set of pages corresponds to a respective TB of the TBG, and where a page size for the soft buffer is based on the maximum TBS.

In some examples, the UE soft buffer manager 1055 is capable of, configured to, or operable to support a means for determining, based on the negative acknowledgment, a second set of pages from that are purged from the soft buffer of the UE, where a first quantity of pages of the set of pages is equal to a second quantity of pages of the second set of pages.

In some examples, the HARQ manager 1050 is capable of, configured to, or operable to support a means for obtaining, with the negative acknowledgment, an indication of a first HARQ ID associated with the TBG, where the second set of pages are associated with a second HARQ ID.

In some examples, the second TBS is based on the first TBS divided by the maximum TBS.

Figure 11:
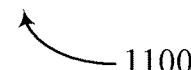
FIG. 11 shows a diagram of a system including a device that supports TBS and soft buffer management for shared channel transmissions in accordance with one or more aspects of the present disclosure.

FIG. 11 shows a diagram of a system 1100 including a device 1105 that supports TBS and soft buffer management for shared channel transmissions in accordance with one or more aspects of the present disclosure. The device 1105 may be an example of or include components of a device 805, a device 905, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting TBS and soft buffer management for shared channel transmissions). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network entities 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for outputting control signaling that schedules a set of resources for a shared channel transmission, where the set of resources indicates that a first TBS for the shared channel transmission exceeds a maximum TBS. The communications manager 1120 is capable of, configured to, or operable to support a means for communicating the shared channel transmission via the set of resources, where the shared channel transmission includes a set of multiple TBs associated with respective code blocks and respective CRC bits, and where a second TBS for each of the set of multiple TBs is based on the maximum TBS.

By including or configuring the communications manager 1120 in accordance with examples as described herein, the device 1105 may support techniques for more efficient utilization of communication resources, improved coordination between devices, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of TBS and soft buffer management for shared channel transmissions as described herein, or the at least one processor 1135 and the at least one memory 1125 may be otherwise configured to, individually or collectively, perform or support such operations.

FIG. 12 shows a flowchart illustrating a method 1200 that supports TBS and soft buffer management for shared channel transmissions in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving control signaling that schedules a set of resources for a shared channel transmission, where the set of resources indicates that a first TBS for the shared channel transmission exceeds a maximum TBS. The operations of 1205 may be performed in accordance with examples as disclosed herein. In some examples, aspects of the operations of 1205 may be performed by a shared channel transmission scheduling manager 625 as described with reference to FIG. 6.

At 1210, the method may include communicating the shared channel transmission via the set of resources, where the shared channel transmission includes a set of multiple TBs associated with respective code blocks and respective CRC bits, and where a second TBS for each of the set of multiple TBs is based on the maximum TBS. The operations of 1210 may be performed in accordance with examples as disclosed herein. In some examples, aspects of the operations of 1210 may be performed by a shared channel transmission manager 630 as described with reference to FIG. 6.

FIG. 13 shows a flowchart illustrating a method 1300 that supports TBS and soft buffer management for shared channel transmissions in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include outputting control signaling that schedules a set of resources for a shared channel transmission, where the set of resources indicates that a first TBS for the shared channel transmission exceeds a maximum TBS. The operations of 1305 may be performed in accordance with examples as disclosed herein. In some examples, aspects of the operations of 1305 may be performed by a shared channel transmission scheduling manager 1025 as described with reference to FIG. 10.

At 1310, the method may include communicating the shared channel transmission via the set of resources, where the shared channel transmission includes a set of multiple TBs associated with respective code blocks and respective CRC bits, and where a second TBS for each of the set of multiple TBs is based on the maximum TBS. The operations of 1310 may be performed in accordance with examples as disclosed herein. In some examples, aspects of the operations of 1310 may be performed by a shared channel transmission manager 1030 as described with reference to FIG. 10.

The following provides an overview of aspects of the present disclosure:

Aspect 1: A method for wireless communications at a UE, comprising: receiving control signaling that schedules a set of resources for a shared channel transmission, wherein the set of resources indicates that a first TBS for the shared channel transmission exceeds a maximum TBS; and communicating the shared channel transmission via the set of resources, wherein the shared channel transmission comprises a plurality of TBs associated with respective code blocks and respective CRC bits, and wherein a second TBS for each of the plurality of TBs is based at least in part on the maximum TBS.

Aspect 2: The method of aspect 1, further comprising: communicating an indication of the maximum TBS, wherein communication of the shared channel transmission is based at least in part on communication of the indication of the maximum TBS.

Aspect 3: The method of any of aspects 1 through 2, further comprising: receiving, via the control signaling, an indication of a set of HARQ identifiers associated with a set of TB groups associated with the shared channel transmission, wherein each of the set of TB groups includes one or more of the plurality of TBs.

Aspect 4: The method of any of aspects 1 through 3, further comprising: receiving, via the control signaling, an indication of a first HARQ identifier associated with a first TB group of a set of TB groups, wherein each TB group of the set of TB groups includes one or more of the plurality of TBs, and wherein respective HARQ identifiers for a remainder of the set of TB groups are based at least in part on the first HARQ identifier.

Aspect 5: The method of any of aspects 1 through 4, further comprising: receiving, via the control signaling, an indication of a HARQ identifier associated with the shared channel transmission and a quantity of acknowledgment bit fields associated with the HARQ identifier that correspond to a set of TB groups associated with the shared channel transmission, wherein each of the set of TB groups includes one or more of the plurality of TBs.

Aspect 6: The method of any of aspects 1 through 5, further comprising: receiving, via the control signaling, an indication of a set of TB groups associated with the shared channel transmission, wherein each of the set of TB groups includes one or more of the plurality of TBs; transmitting a negative acknowledgement for a TB group of the set of TB groups; and updating a set of pages of a soft buffer of the UE based at least in part on transmission of the negative acknowledgement, wherein each page of the set of pages corresponds to a respective TB of the TB group, and wherein a page size for the soft buffer is based at least in part on the maximum TBS.

Aspect 7: The method of aspect 6, further comprising: purging, based at least in part on transmission of the negative acknowledgement, a second set of pages from the soft buffer of the UE, wherein a first quantity of pages of the set of pages is equal to a second quantity of pages of the second set of pages.

Aspect 8: The method of aspect 7, further comprising: transmitting, with the negative acknowledgement, an indication of a first HARQ identifier associated with the TB group, wherein the second set of pages are associated with a second HARQ identifier.

Aspect 9: The method of any of aspects 1 through 8, wherein the second TBS is based at least in part on the first TBS divided by the maximum TBS.

Aspect 10: A method for wireless communications at a network entity, comprising: outputting control signaling that schedules a set of resources for a shared channel transmission, wherein the set of resources indicates that a first TBS for the shared channel transmission exceeds a maximum TBS; and communicating the shared channel transmission via the set of resources, wherein the shared channel transmission comprises a plurality of TBs associated with respective code blocks and respective CRC bits, and wherein a second TBS for each of the plurality of TBs is based at least in part on the maximum TBS.

Aspect 11: The method of aspect 10, further comprising: communicating an indication of the maximum TBS, wherein communication of the shared channel transmission is based at least in part on communication of the indication of the maximum TBS.

Aspect 12: The method of any of aspects 10 through 11, further comprising: outputting, via the control signaling, an indication of a set of HARQ identifiers associated with a set of TB groups associated with the shared channel transmission, wherein each of the set of TB groups includes one or more of the plurality of TBs.

Aspect 13: The method of any of aspects 10 through 12, further comprising: outputting, via the control signaling, an indication of a first HARQ identifier associated with a first TB group of a set of TB groups, wherein each TB group of the set of TB groups includes one or more of the plurality of TBs, and wherein respective HARQ identifiers for a remainder of the set of TB groups are based at least in part on the first HARQ identifier.

Aspect 14: The method of any of aspects 10 through 13, further comprising: outputting, via the control signaling, an indication of a HARQ identifier associated with the shared channel transmission and a quantity of acknowledgment bit fields associated with the HARQ identifier that correspond to a set of TB groups associated with the shared channel transmission, wherein each of the set of TB groups includes one or more of the plurality of TBs.

Aspect 15: The method of any of aspects 10 through 14, further comprising: outputting, via the control signaling, an indication of a set of TB groups associated with the shared channel transmission, wherein each of the set of TB groups includes one or more of the plurality of TBs; obtaining, from a UE, a negative acknowledgement for a TB group of the set of TB groups; and determining a set of pages of a soft buffer of the UE that are updated based at least in part on the negative acknowledgement, wherein each page of the set of pages corresponds to a respective TB of the TB group, and wherein a page size for the soft buffer is based at least in part on the maximum TBS.

Aspect 16: The method of aspect 15, further comprising: determining, based at least in part on the negative acknowledgement, a second set of pages from that are purged from the soft buffer of the UE, wherein a first quantity of pages of the set of pages is equal to a second quantity of pages of the second set of pages.

Aspect 17: The method of aspect 16, further comprising: obtaining, with the negative acknowledgement, an indication of a first HARQ identifier associated with the TB group, wherein the second set of pages are associated with a second HARQ identifier.

Aspect 18: The method of any of aspects 10 through 17, wherein the second TBS is based at least in part on the first TBS divided by the maximum TBS.

Aspect 19: A UE for wireless communications, comprising one or more memories storing processor-executable code, and one or more processors coupled with the one or more memories and individually or collectively operable to execute the code to cause the UE to perform a method of any of aspects 1 through 9.

Aspect 20: A UE for wireless communications, comprising at least one means for performing a method of any of aspects 1 through 9.

Aspect 21: A non-transitory computer-readable medium storing code for wireless communications, the code comprising instructions executable by one or more processors to perform a method of any of aspects 1 through 9.

Aspect 22: A network entity for wireless communications, comprising one or more memories storing processor-executable code, and one or more processors coupled with the one or more memories and individually or collectively operable to execute the code to cause the network entity to perform a method of any of aspects 10 through 18.

Aspect 23: A network entity for wireless communications, comprising at least one means for performing a method of any of aspects 10 through 18.

Aspect 24: A non-transitory computer-readable medium storing code for wireless communications, the code comprising instructions executable by one or more processors to perform a method of any of aspects 10 through 18.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving control signaling that schedules a set of resources for a shared channel transmission, wherein the set of resources indicates that a first transport block size for the shared channel transmission exceeds a maximum transport block size; and
communicating the shared channel transmission via the set of resources, wherein the shared channel transmission comprises a plurality of transport blocks associated with respective code blocks and respective cyclic redundancy check bits, and wherein a second transport block size for each of the plurality of transport blocks is based at least in part on the maximum transport block size.

2. The method of claim 1, further comprising:
communicating an indication of the maximum transport block size, wherein communication of the shared channel transmission is based at least in part on communication of the indication of the maximum transport block size.

3. A user equipment (UE), comprising:
one or more memories storing processor-executable code; and
one or more processors coupled with the one or more memories and individually or collectively operable to execute the code to cause the UE to:
receive control signaling that schedules a set of resources for a shared channel transmission, wherein the set of resources indicates that a first transport block size for the shared channel transmission exceeds a maximum transport block size; and
communicate the shared channel transmission via the set of resources, wherein the shared channel transmission comprises a plurality of transport blocks associated with respective code blocks and respective cyclic redundancy check bits, and wherein a second transport block size for each of the plurality of transport blocks is based at least in part on the maximum transport block size.

4. The UE of claim 3, wherein the one or more processors are individually or collectively further operable to execute the code to cause the UE to:
communicate an indication of the maximum transport block size, wherein communication of the shared channel transmission is based at least in part on communication of the indication of the maximum transport block size.

5. The UE of claim 3, wherein the one or more processors are individually or collectively further operable to execute the code to cause the UE to:
receive, via the control signaling, an indication of a set of hybrid automatic repeat request identifiers associated with a set of transport block groups associated with the shared channel transmission, wherein each of the set of transport block groups includes one or more of the plurality of transport blocks.

6. The UE of claim 3, wherein the one or more processors are individually or collectively further operable to execute the code to cause the UE to:
receive, via the control signaling, an indication of a first hybrid automatic repeat request identifier associated with a first transport block group of a set of transport block groups, wherein each transport block group of the set of transport block groups includes one or more of the plurality of transport blocks, and wherein respective hybrid automatic repeat request identifiers for a remainder of the set of transport block groups are based at least in part on the first hybrid automatic repeat request identifier.

7. The UE of claim 3, wherein the one or more processors are individually or collectively further operable to execute the code to cause the UE to:
receive, via the control signaling, an indication of a hybrid automatic repeat request identifier associated with the shared channel transmission and a quantity of acknowledgment bit fields associated with the hybrid automatic repeat request identifier that correspond to a set of transport block groups associated with the shared channel transmission, wherein each of the set of transport block groups includes one or more of the plurality of transport blocks.

8. The UE of claim 3, wherein the one or more processors are individually or collectively further operable to execute the code to cause the UE to:
receive, via the control signaling, an indication of a set of transport block groups associated with the shared channel transmission, wherein each of the set of transport block groups includes one or more of the plurality of transport blocks;
transmit a negative acknowledgment for a transport block group of the set of transport block groups; and
update a set of pages of a soft buffer of the UE based at least in part on transmission of the negative acknowledgment, wherein each page of the set of pages corresponds to a respective transport block of the transport block group, and wherein a page size for the soft buffer is based at least in part on the maximum transport block size.

9. The UE of claim 8, wherein the one or more processors are individually or collectively further operable to execute the code to cause the UE to:

purging, based at least in part on transmission of the negative acknowledgment, a second set of pages from the soft buffer of the UE, wherein a first quantity of pages of the set of pages is equal to a second quantity of pages of the second set of pages.

10. The UE of claim 9, wherein the one or more processors are individually or collectively further operable to execute the code to cause the UE to:

transmit, with the negative acknowledgment, an indication of a first hybrid automatic repeat request identifier associated with the transport block group, wherein the second set of pages are associated with a second hybrid automatic repeat request identifier.

11. The UE of claim 3, wherein the second transport block size is based at least in part on the first transport block size divided by the maximum transport block size.

12. A network entity, comprising:

one or more memories storing processor-executable code; and one or more processors coupled with the one or more memories and individually or collectively operable to execute the code to cause the network entity to:

output control signaling that schedules a set of resources for a shared channel transmission, wherein the set of resources indicates that a first transport block size for the shared channel transmission exceeds a maximum transport block size; and communicate the shared channel transmission via the set of resources, wherein the shared channel transmission comprises a plurality of transport blocks associated with respective code blocks and respective cyclic redundancy check bits, and wherein a second transport block size for each of the plurality of transport blocks is based at least in part on the maximum transport block size.

13. The network entity of claim 12, wherein the one or more processors are individually or collectively further operable to execute the code to cause the network entity to:

communicate an indication of the maximum transport block size, wherein communication of the shared channel transmission is based at least in part on communication of the indication of the maximum transport block size.

14. The network entity of claim 12, wherein the one or more processors are individually or collectively further operable to execute the code to cause the network entity to:

output, via the control signaling, an indication of a set of hybrid automatic repeat request identifiers associated with a set of transport block groups associated with the shared channel transmission, wherein each of the set of transport block groups includes one or more of the plurality of transport blocks.

15. The network entity of claim 12, wherein the one or more processors are individually or collectively further operable to execute the code to cause the network entity to:

output, via the control signaling, an indication of a first hybrid automatic repeat request identifier associated with a first transport block group of a set of transport block groups, wherein each transport block group of the set of transport block groups includes one or more of the plurality of transport blocks, and wherein respective hybrid automatic repeat request identifiers for a remainder of the set of transport block groups are based at least in part on the first hybrid automatic repeat request identifier.

16. The network entity of claim 12, wherein the one or more processors are individually or collectively further operable to execute the code to cause the network entity to:

output, via the control signaling, an indication of a hybrid automatic repeat request identifier associated with the shared channel transmission and a quantity of acknowledgment bit fields associated with the hybrid automatic repeat request identifier that correspond to a set of transport block groups associated with the shared channel transmission, wherein each of the set of transport block groups includes one or more of the plurality of transport blocks.

17. The network entity of claim 12, wherein the one or more processors are individually or collectively further operable to execute the code to cause the network entity to:

output, via the control signaling, an indication of a set of transport block groups associated with the shared channel transmission, wherein each of the set of transport block groups includes one or more of the plurality of transport blocks;

obtain, from a user equipment (UE), a negative acknowledgment for a transport block group of the set of transport block groups; and determine a set of pages of a soft buffer of the UE that are updated based at least in part on the negative acknowledgment, wherein each page of the set of pages corresponds to a respective transport block of the transport block group, and wherein a page size for the soft buffer is based at least in part on the maximum transport block size.

18. The network entity of claim 17, wherein the one or more processors are individually or collectively further operable to execute the code to cause the network entity to:

determine, based at least in part on the negative acknowledgment, a second set of pages from that are purged from the soft buffer of the UE, wherein a first quantity of pages of the set of pages is equal to a second quantity of pages of the second set of pages.

19. The network entity of claim 18, wherein the one or more processors are individually or collectively further operable to execute the code to cause the network entity to:

obtain, with the negative acknowledgment, an indication of a first hybrid automatic repeat request identifier associated with the transport block group, wherein the second set of pages are associated with a second hybrid automatic repeat request identifier.

20. The network entity of claim 12, wherein the second transport block size is based at least in part on the first transport block size divided by the maximum transport block size.

* * * * *